Feb. 25, 1969
A. D. PARKER
3,429,121
EQUIPMENT OPERATING TIME RECORDER
Filed Aug. 3, 1967
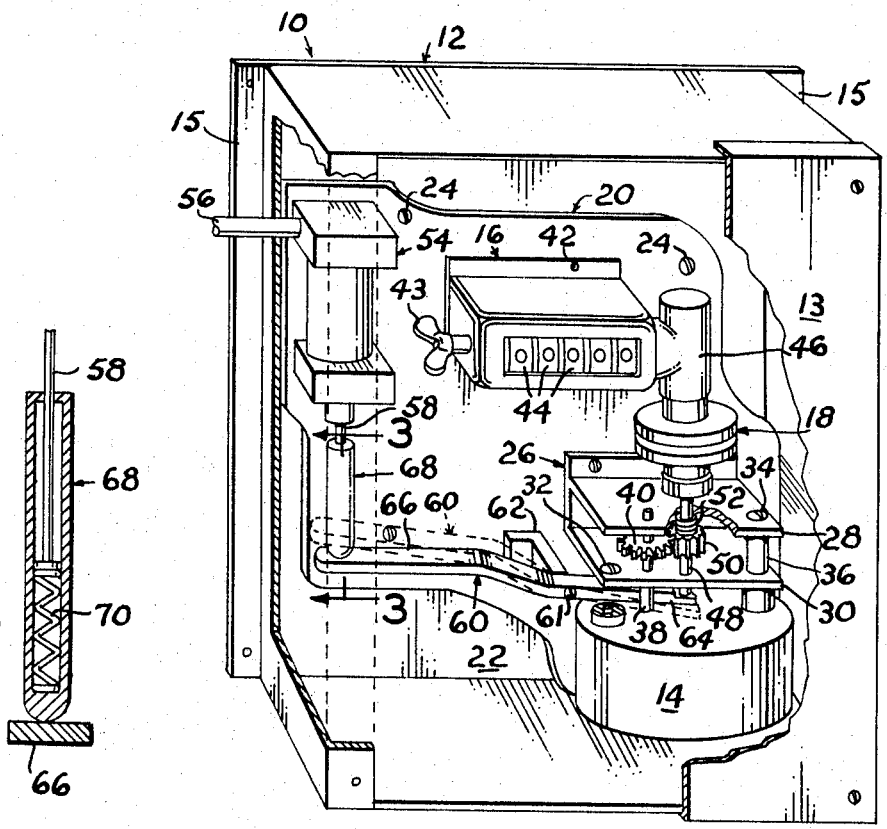
ALVA D. PARKER
*INVENTOR.*
BY
*Robert K. Rhea*
AGENT

United States Patent Office 3,429,121
Patented Feb. 25, 1969

3,429,121
EQUIPMENT OPERATING TIME RECORDER
Alva D. Parker, Box 94717, Oklahoma City, Okla. 73109
Filed Aug. 3, 1967, Ser. No. 658,184
U.S. Cl. 58—145    6 Claims
Int. Cl. G04b 5/20

ABSTRACT OF THE DISCLOSURE

A spring wound clock is mounted within a housing and drivably connected with a disk register through a pair of gears and a friction clutch. A pressure cylinder within the housing is connected with and operated by the equipment to be timed. A lever, pivotally mounted intermediate its ends and extending between the cylinder and the pair of gears, actuates and releases the clutch for driving and stopping the register in response to pressure applied to or released from the cylinder.

Background of the invention

It is desirable in the operation of machinery, having parts which must periodically be replaced due to wear and tear, that a means be provided for determining the useful life of such replaceable components in order to learn which brand of such equipment has the longer useful life. By way of example, in oil well drilling equipment, a mud-hog pump is used to circulate drilling fluid. Such pumps have liners in their cylinders within which the reciprocating pistons operate. These liners are subjected to the abrasive action of the ingredients of drilling fluid and, therefore, wear out relatively soon.

The present invention is intended to be used for determining the useful life of pump cylinder liners or other equipment by connecting the instant invention with an air line, or the like, connected with the drilling equipment such as the draw works so that the recorder will be activated during the time that the equipment is operating and inactivated when the equipment is stopped or shut down.

One such equipment time recording device is disclosed by Patent No. 1,363,813 which employes a clock and a train of gears operated by a diaphragm in turn expanded or released by pressure through a pipe connected with the lubricating system of a motor. This device is relatively delicate in construction and will not withstand the rough treatment usually associated with the use and handling of oil well drilling equipment. Furthermore, rupture of the diaphragm through continuous use or too great a pressure results in an inaccurate record. The present invention on the other hand is relatively rugged in construction and is operated by positive acting components which will not easily get out of order and which will withstand the vibration of a drilling rig and other relatively rough treatment.

Summary of the invention

A substantially U-shaped bracket is mounted on a platform in turn connected to the bottom or back wall of a surrounding housing by screws and rubber spacers for reducing vibration. A spring driven clock is connected to the bracket with the driving shaft of the clock projecting through the legs of the U-shaped bracket. A driving gear is mounted on the clock shaft. A stub shaft, having a pinion thereon in mesh with the driving gear, extends through the legs of the bracket and is coaxially connected with a friction clutch in turn connected with a disk register mounted on the platform. A pressure operated cylinder is mounted on the platform with its piston rod releasably contacting an end portion of a lever pivotally supported intermediate its ends by the platform and extending between the piston rod and the end of the stub shaft opposite the clutch so that actuation of the cylinder moves the stub shaft longitudinally for actuating the clutch. A spring, around the stub shaft, releases the clutch when pressure on the cylinder is released.

The principal object of the invention is to provide a recorder which visably indicates, in hours, the total operating time of equipment and which is activated by air pressure, or the like, used by the operating equipment.

Brief description of the drawings

FIGURE 1 is a perspective view of the device;
FIGURE 2 is a perspective view, on a larger scale, of the device in operating position with parts broken away for clarity and illustrating by dotted lines, its inactivated position; and
FIGURE 3 is a vertical cross-sectional view, on a different scale, taken substantially along the line 3—3 of FIG. 1.

Description of the preferred embodiment

Like characters of reference designate like parts in those figures of the drawings in which they occur.

In the drawings:

The reference numeral 10 indicates the device, as a whole, comprising a rectangular housing 12 having a lid or cover 13 which shields a conventional spring driven clock works 14 driveably connected with a recorder or register 16 through a friction clutch 18 in the manner hereinafter described. The housing 12 is provided with lateral flanges 15 for mounting the housing on a support, not shown, associated with the equipment to be timed.

A platform 20 is mounted on the housing bottom or back wall 22 in parallel spaced relation with respect to the back wall 22 in parallel spaced relation with respect to the latter by screws 24 extending through resilient bushings, not shown, interposed between the back wall and the platform for the purpose of dampening vibration. A substantially U-shaped bracket 26 is mounted on the platform 20 with its substantially rectangular legs 28 and 30 projecting outward perpendicular with respect to the surface of the platform.

The clock 14 is connected with the bracket leg 30, in spaced-apart relation, by a screw 32 while a screw 34 connects the clock to the bracket leg 28 through the leg 30 with a spacer 36 interposed between the legs. The driving shaft 38 of the clock extends through and is journaled by both bracket legs 28 and 30. The clock shaft 38 has a spur gear 40 coaxially secured thereto between the bracket legs.

The register 16 is conventional and is mounted on the platform 20 by screws 42. The register 16 includes a re-set screw 43 and a plurality of disks 44 having numerals inscribed thereon which are driven by a gear box 46 having its operating end projecting toward the legs of the bracket 26. A stub shaft 48 extends through and is journaled by the bracket legs 28 and 30 in parallel spaced relation with respect to the clock shaft 38. A pinion 50 is secured to the stub shaft 38 between the bracket legs 28 and 30 and in mesh with the spur gear 40. The stub shaft projects toward the gear box 46 and the register 16. A friction clutch 18 is interposed between and connected, respectively, to the register gear box 46 and adjacent end of the stub shaft 48 for driving and releasing the register 16 as hereinafter described. A spring 52 surrounds the stub shaft 48 between the pinion 50 and bracket leg 28 for normally urging the clutch 18 to release position.

A pressure cylinder, such as an air cylinder 54, is mounted on the platform 20 laterally of the register 16 and connected with the operating equipment, not shown, by a line 56. The pressure cylinder includes a piston rod 58 connected with its piston, not shown, in parallel spaced relation with respect to the stub shaft 48. A lever 60 is pivotally connected, intermediate its ends by a screw 61, to a bracket 62 mounted on the platform 20 laterally of the bracket 26 and clock 14. One end portion 64 of the lever projects into the spacing between the clock 14 and bracket leg 30 and contacts the adjacent end surface of the stub shaft 48 projecting through the bracket leg 30. The other end portion 66 of the lever 60 intersects the longitudinal axis of the piston rod 58 and is contacted by one end surface of a mandrel 68 coaxially secured to the piston rod 58. The mandrel 68 is tubular (FIG. 3) and coaxially surrounds, at its opposite end portion, the free end portion of the piston rod 58. A spring 70 is interposed between the closed end of the mandrel and the adjacent end of the piston rod 58, within the mandrel, so that the mandrel is maintained in contact with the adjacent end portion 66 of the lever and yet, by means of the spring 70, prevents undue pressure being exerted against the stub shaft 48. The resistance of the spring 52 is greater than the resistance of the spring 70 for the reasons readily apparent.

*Operation*

In operation the device is mounted in a desired location and the air line 56 connected with the operating equipment to be timed. The clock 14 is wound and its shaft 38 drives the stub shaft 48 through the gear and pinion. The register 16 is re-set to zero, if desired, or its reading recorded. Air pressure on the line 56 actuates the cylinder 54 to move its piston rod 58 toward the mandrel 68 which applies a force on the lever 60 to pivot the latter about its fulcrum point or screw 61 so that the end portion 64 of the lever contacts and moves the stub shaft 48 longitudinally to close the clutch 18 so that the latter transmits the clock drive force to the register 16. The gear ratio of the gear 40, pinion 50 and register gear box 46 is such that the register disks indicate the passage of time in hours. This action continues until such time as the operating equipment is shut down and air pressure is released from the cylinder 54 wherein the spring 52 moves the stub shaft 48 longitudinally toward the clock 14 to open or release the clutch 18 which interrupts the time register 16. The clock works 14 then continues its operation of driving the stub shaft 48 without actuating the register 16. The numerals appearing on the face of the register disks 44 are visible through a window 72 in the housing cover 13 and indicate, in hours, the useful life of the equipment under test. This information is transferred to a report book which may be conveniently stored in a receptacle 74 attached to a side wall of the housing 12 and shielded from the weather by a hingedly connected lid 76. Equipment shut down time for periodic servicing or other reasons releases the clutch 18 and interrupts the register 16 in the manner described hereinabove. Resumption of operation of the equipment after such shut down resumes operation of the register 16 in the manner described.

Obviously the invention is susceptible to some change or alteration without defeating its practicability, and I therefore do not wish to be confined to the preferred embodiment shown in the drawings and described herein.

I claim:
1. An equipment operating time recorder, comprising: a support; a spring driven clock; bracket means mounting said clock on said support; gear means driven by said clock; a register mounted on said support; clutch means releasably connecting said gear means with said register; a pressure operated cylinder mounted on said support, said cylinder having a piston rod; a lever pivotally mounted on said support and extending between said piston rod and said gear means for engaging said clutch in response to movement of said piston rod in one direction; and spring means releasing said clutch in response to movement of said piston rod in the other direction.

2. Structure as specified in claim 1 in which said bracket means comprises a U-shaped bracket having substantially rectangular legs projecting laterally of said support.

3. Structure as specified in claim 2 in which said clock is provided with a driving shaft extending through and journaled by said bracket legs, and in which said gear means comprises, a spur gear on said clock shaft between said bracket legs, a stub shaft extending through and journaled by said bracket legs, and a pinion on said stub shaft between said bracket legs and meshing with said spur gear.

4. Structure as specified in claim 3 in which said clutch means comprises a friction disc clutch interposed between one end of said stub shaft and said register.

5. Structure as specified in claim 4 in which said spring means comprises a helical spring surrounding said stub shaft between said pinion and one said bracket leg and normally urging said stub shaft toward a clutch released position.

6. Structure as specified in claim 5 and a tubular member having one end portion surrounding the outwardly projecting end portion of said piston rod, said tubular member having an opposite closed end, and other spring means interposed between the closed end portion of said tubular member and the surrounded end portion of said piston rod for normally urging the closed end of said tubular member away from said piston rod and toward contact with said lever.

References Cited

UNITED STATES PATENTS 1,319,451 10/1919 Arthur _____ 58—152
3,090,192 5/1963 Kraft et al. _____ 58—39.9

RICHARD B. WILKINSON, *Primary Examiner.*

E. C. SIMMONS, *Assistant Examiner.*